United States Patent [19]
Reuter

[11] Patent Number: 6,026,879
[45] Date of Patent: Feb. 22, 2000

[54] PNEUMATIC TIRE WITH POLYESTER BELT CORD

[75] Inventor: René François Reuter, Burden, Luxembourg

[73] Assignee: The Goodyear Tire & Rubber Company, Akron, Ohio

[21] Appl. No.: 09/100,057

[22] Filed: Jun. 19, 1998

Related U.S. Application Data

[62] Division of application No. 08/726,139, Oct. 4, 1996, Pat. No. 5,855,704.
[51] Int. Cl.[7] ............................... B60C 9/00; B60C 9/18; B60C 9/20
[52] U.S. Cl. ........................ 152/527; 152/451; 152/526
[58] Field of Search ................................. 152/451, 526, 152/527; 57/902, 236

[56] References Cited

U.S. PATENT DOCUMENTS 3,854,515   12/1974   Takemura et al. .................. 152/527

*Primary Examiner*—Adrienne C. Johnstone
*Attorney, Agent, or Firm*—David E Wheeler

[57] ABSTRACT

A pneumatic tire for heavy duty use comprises at least one radial carcass ply, a tread portion disposed radially outwardly of the crown region of the carcass plies and a crown reinforcing structure interposed between the tread portion and the crown region of the carcass plies. The crown reinforcing structure includes a belt assembly having at least a first, radially innermost and a second, radially outermost belt ply. The cords reinforcing the belt plies are preferably made of PET or PEN and have a linear density comprised between 2000 and 16000 Denier, a twist comprised between 2 and 7 TPI and a twist multiplier comprised between 3 and 5.

3 Claims, 1 Drawing Sheet

PNEUMATIC TIRE WITH POLYESTER BELT CORD

CROSS REFERENCE TO RELATED APPLICATION

This application is a Divisional of Ser. No. 08/726,139, filed Oct. 4, 1996, now U.S. Pat. No. 5,855,704.

BACKGROUND OF THE INVENTION

1. Field of the Invention

The present invention relates generally to textile cords for pneumatic tires and more specifically to cords for belts of radial carcass tires for heavy duty use.

2. Description of the Related Art

Radial carcass tires, especially off-the-road tires and heavy duty off-the-road tires have typically 1 to 5 carcass plies, 2 to 6 belt plies and one to four sets of beads.

Off-the-road tires, because of the nature of their use, are exposed to cutting and delamination caused by sharp rocks and uneven terrain. This problem is addressed by providing such tires with belts reinforced with high strength material.

One reinforcement cord currently used in belts of heavy duty industrial tires is composed of 3 yarns of aramid, having a linear density of 1500 Denier, the yarns and the cord being twisted at 6.9 turns per inch (TPI). Such cord has a strength of about 750 N. Aramid is high cost to manufacture and to process.

Another reinforcement cord currently used in belts of agricultural tires is composed of 2–3 yarns of rayon, having a linear yarn density of 1650 to 2200 Denier, the yarns and the cord being respectively twisted at about 9 TPI and 6.5 TPI. Such cords have strengths of about 180 N and 350 N respectively. This cord is high cost to manufacture because of high material cost, and the cord is subject to moisture pick-up and the cord has a low tenacity.

Polyester cords, such as 2.000/2 6/6 or 1.000/2 12/12 TPI which have respectively twist multipliers of 5.2 and 7.35 are also currently used to reinforce belt plies of farm tires. The high twist levels of between 6 and 12 TPI, however, do not take full advantage of the dimensional stability, the modulus, the shrinkage, and the tensile strength of the polyester material. The material cost for this material is also high.

SUMMARY OF THE INVENTION

It an object of the present invention to provide a cord with high tensile strength, high modulus, high dimensional stability and low gauge, while maintaining sufficient fatigue resistance, and which is less expensive to manufacture and to process than a cord used in the prior art.

A polyester cord for a belt of a pneumatic tire of the invention has a linear density of 2000 to 16000 Denier and comprises 2 to 9 yarns. The yarns have substantially the same twist as the cords and the cord has a twist of 2 to 7 TPI and a twist multiplier of 3 to 5. In one illustrated embodiment, the cord comprises 2 to 3 yarns, has a linear density of 2000 to 4000 Denier, a twist multiplier of 3.5 to 4.5 and a twist of 4.5 to 6.5 TPI. In another illustrated embodiment the cord comprises 3 to 9 yarns, has a Denier of 10000 to 15000, a twist multiplier of 3.5 to 4.5 and a twist of 2.2 to 3.2 TPI. In a third embodiment, the cord comprises 6–9 yarns, has a Denier of 11000 to 13000, a twist multiplier of 3,5 to 4,5 and a twist of 2.5 to 3.0 TPI.

The cord of the invention is preferably made of polyester such as poly-ethyleneterephthalate (PET) or poly-ethylenenaphthalate (PEN).

Also provided in the invention is a pneumatic tire comprising at least one radial carcass ply, a tread disposed radially outwardly of the crown region of the carcass and a crown reinforcing structure interposed between the tread portion and the crown region of the carcass in circumferential surrounding relation to the carcass. The crown reinforcing structure of the tire includes a belt assembly having at least a first, radially innermost and a second, radially outermost belt ply, each of the belt plies comprising reinforcement cords extending parallel to one another in each belt ply, and at least one belt ply is reinforced with cords made according to the invention. In an illustrated embodiment, the crown reinforcing structure of the tire comprises 2 belt plies wherein the cords of the belt plies have a linear density of 2000 to 4000 Denier and a lateral cord density of 20 to 30 EPI. In a second embodiment, the crown reinforcing structure comprises four belt plies wherein the cords have a linear density of 11000 to 13000 Denier and a lateral cord density in the belt plies of 10 to 15 EPI. In a third embodiment, the crown reinforcing structure comprises 2 belt plies and the cords have a linear density of 11,000 to 13,000 Denier and a lateral cord density in the belt plies of 10 to 15 EPI.

The fabric using the cords has a distance between two neighboring cords (rivet area) far above the minimum distance of 0.1 mm required for guaranteeing sufficient rubber flow between the cords during calendering; such rubber penetration between the cords is required for cord separation resistance. At the same time the fabric ensures sufficient tire reinforcement strength, which is defined by individual cord strength and lateral cord density.

BRIEF DESCRIPTION OF THE DRAWINGS

To acquaint persons skilled in the art most closely related to the instant invention, certain preferred embodiments thereof are now described with reference to the annexed drawings. These embodiments are directed towards the construction of polyester cords, as herebelow defined, and they are illustrative and can be modified in numerous ways within the scope of the invention defined in the claims herebelow.

Definitions

As used herein and in the claims, the "equatorial plane" of the tire is a plane that is perpendicular to the axis of rotation of the tire and passes through the center of the tire tread, the terms "axial" and "axially" refer to directions which are parallel to the axis of rotation of the tire and the terms "radial" and "radially" refer to directions that are radially toward or away from the axis of rotation of the tire. "Denier" is understood to mean the weight in grams of 9,000 meters of a yarn before the yarn has a twist imparted thereto.

DETAILED DESCRIPTION OF THE INVENTION

Figure 1:
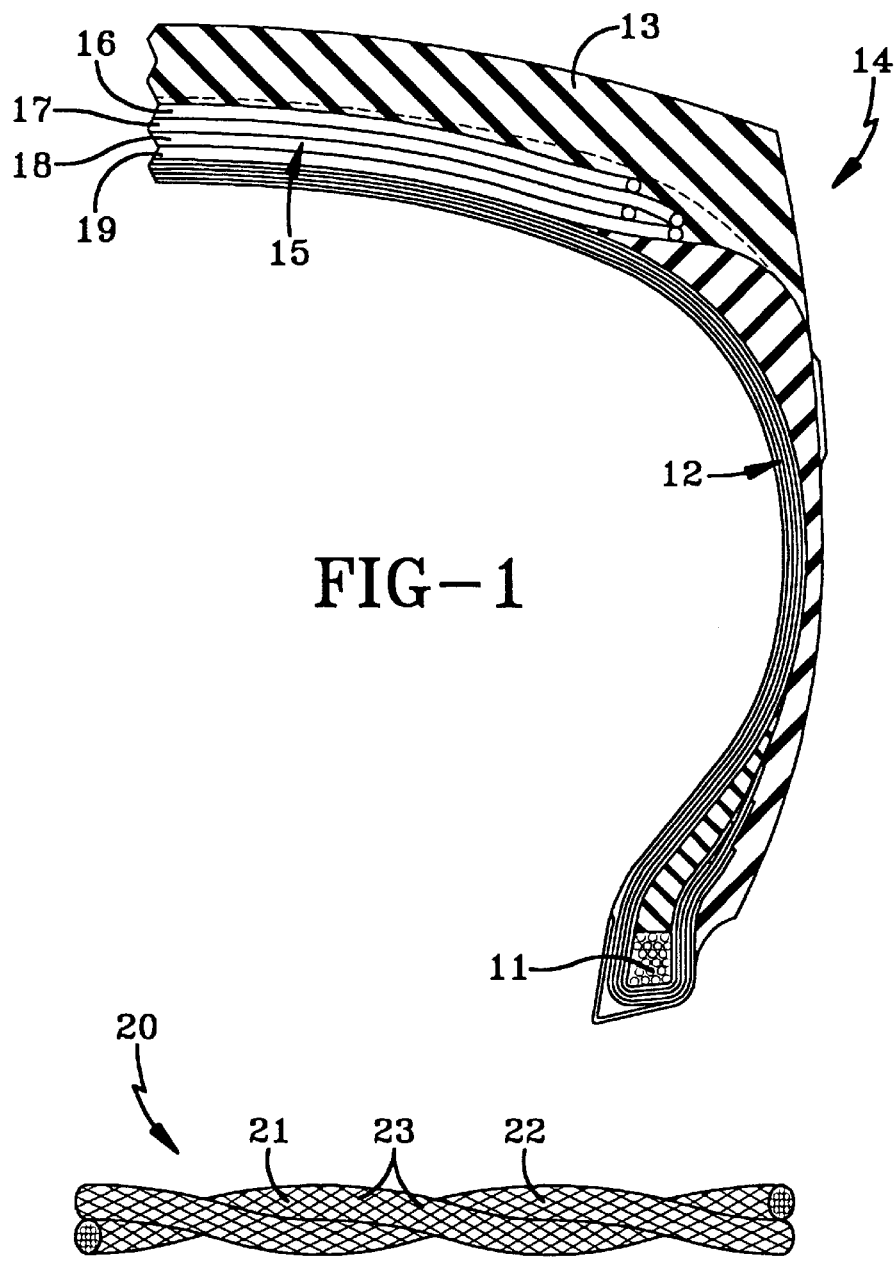
FIG. 1 is a cross-sectional view of the right side of a pneumatic tire made in accordance with the present invention.

With reference to FIG. 1, there is represented a portion of a radial carcass pneumatic tire 10 having a pair of substantially inextensible bead cores 11 which are axially spaced apart with four radial carcass plies 12 extending between the bead cores 11. The carcass plies are folded axially and radially outwardly about each of the bead cores and are reinforced by cords which are substantially parallel to each other and make an angle with the equatorial plane (EP) of the tire. The cords of the carcass plies 12 can be made of any suitable material, for example steel, rayon, polyester, polyamide or aromatic polyamide. The crown area 14 of the tire 10 is reinforced by a belt assembly 15 located radially inwardly of the tire tread 13.

The belt assembly 15 is essentially rigid and comprises four concentric belt plies 16, 17, 18, 19, each of which consists of an elastomeric layer reinforced by polyester cords. The polyester may be polyethylene-naphthalate (PEN) or polyethylene-terephthalate (PET). Within each ply, the cords are substantially parallel to each other. In the instant case, where the tire has four belts, the cords of the radially innermost belt ply 19 make e.g. an angle of about 20°, cords in breakers 18 and 17 make angles of respectively about −20° and 20°, and the cords of the radially outermost belt ply 16 make an angle of about −20°, all with respect to the equatorial plane (EP) of the cured tire.

In an alternative embodiment where the tire has two belt plies, the cords of the radially innermost belt ply 19 may make an angle of 15° to 30° with the equatorial plane (EP) of the cured tire, whereas the cords of the radially outermost belt ply 16 will extend in the diagonally opposite direction to the cords of the radially innermost belt ply 19, i.e. the cords make an angle of −15° to −30° with the equatorial plane (EP) of the cured tire; preferred cord angles are respectively 17° to 23° and −17° to −23°.

Figure 2:
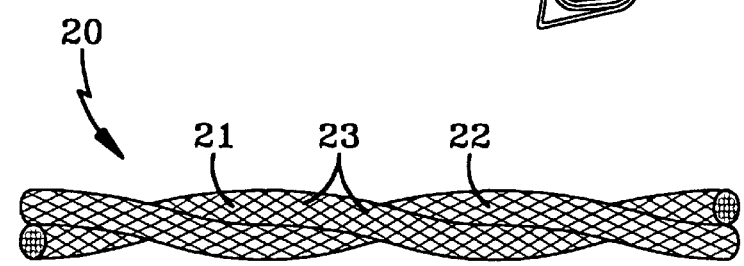
FIG. 2 is a side view of a cord according to the present invention.

Referring now to FIG. 2, there is shown a cord 20 according to the invention comprising two yarns 21, 22 having each a linear density of 1,000 Denier and being twisted at 6.5 TPI; each of the yarns comprises a plurality of polyester filaments 23. The cord is obtained by twisting the yarns at 6.5 TPI at a hand opposite to the one of the cords. The twist multiplier of this cord is about 4. Such a cord is appropriate for reinforcing belts of rear tractor tires. It is recommended to use a cord density of about 25 ends per inch (EPI).

In the cord 20, each of the yarns has its component filaments twisted together a given number of turns per unit of length of the yarn (usually expressed in turns per inch or TPI) and additionally the individual yarns are twisted together a given number of turns per unit of length of the cord. The direction of twist refers to the direction of slope of the spirals of a yarn or cord when it is held vertically. If the slope of the spirals conform in direction to the slope of the letter "S", then the twist is called "S" or "left hand". If the slope of the spirals conform in direction to the slope of the letter "Z", then the twist is called "Z" or "right hand". An "S" or "left hand" twist direction is understood to be an opposite direction from a "Z" or "right hand" twist. "Yarn twist" is understood to mean the twist imparted to a yarn before the yarn is incorporated into a cord, and "cord twist" is understood to mean the twist imparted to two or more yarns when they are twisted together with one another to form a cord.

Figure 3:
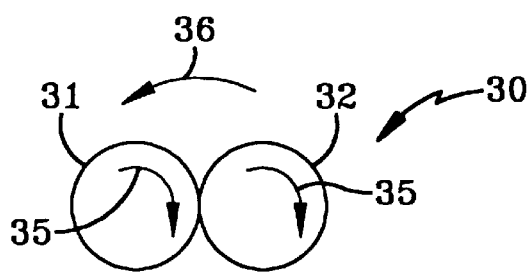
FIGS. 3 and 4 are schematic representations of cross-sections of cords according to the present invention.

In an embodiment of the invention, as shown in FIG. 3, two 1000 Denier yarns 31 and 32 are each twisted in the direction indicated by arrows 35 at 6.5 TPI and the yarns are then twisted into a cord in the direction indicated by arrow 36 at 6.5 TPI to form cord 30. The cord 30 has a twist multiplier of about 4. Such a cord is adapted as reinforcement for belts of farm tires. It is recommended in this case to use a lateral density of 25 to 30 EPI.

Figure 4:
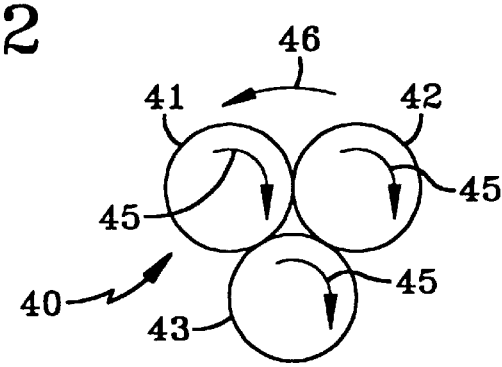

With reference to FIG. 4, there is shown a 3900/3 Denier cord 40, including three yarns 41, 42 and 43. The yarns are twisted in the direction indicated by arrows 45 at 2.7 TPI and the yarns are then twisted together in the direction indicated by arrow 46 at 2.7 TPI. The cord has a twist multiplier of about 4. Such cord may advantageously be used in harvesting tires of size 650/75 R 32 wherein the cords have a lateral density of 13 EPI. The resulting fabric has equal strength per equal surface to currently used belts and improves the belt layout by adding belt gauge at the tire tread area, while at the same time reducing material cost.

Though the invention can be used in cords having only a few thousand Denier, it is with giant cords of more than 8000 Denier that the advantage of reduced cost, tensile strength, modulus and low shrinkage is most significant.

According to the invention, the yarns each have a twist of at least 2 TPI and more preferably of at least 2.5 TPI. The maximum twist which should be imparted to the yarns is 3 TPI, preferably 2.7 TPI. Identical twist of the yarns, although not compulsory to implement the invention, simplifies the manufacturing process. The cord has a twist in the range of 2 to 4 TPI and more preferably in the range of 2.4 to 3 TPI. The amount of twist of the cord and of the yarns can be substantially the same. The yarns have the same, left or right hand twist, the cord twist being in the opposite direction. Cords manufactured from yarns having such high linear density and such low twist imparted thereto, have shown the required tensile, modulus and shrinkage properties.

A cord according to the present invention has a twist multiplier between 3 and 5 and preferably between 3.5 and 4,5. "Twist multiplier" refers to a number that is an indicator of the helix angle that the yarns in a cord make with respect to a longitudinal axis of a cord. As used herein and in the claims, the twist multiplier of a cord is determined according to the following equation which is well known in the textile art.

$$TM = 0.0137 \; CT \times (CD)^{1/2}$$

wherein TM is the twist multiplier;

CT is the number of turns per inch (2.54 cm) of cord length; and

CD is the sum of the deniers of the yarns, and/or subgroups of the yarns of the cord before any twist is imparted to the yarns or subgroups. The twist multiplier is an important feature of a cord, because it characterizes its physical properties, like tensile strength, modulus, elongation and fatigue. Twist multipliers below 5 characterize cords showing high modulus, high tensile strength, high dimensional stability and low shrinkage; and although these cords have a relatively low fatigue resistance these cords can be used as belt reinforcement in agricultural and industrial tires.

The benefits of the present invention become apparent from a comparison test which has been made on aramid and polyester cords according to the invention:

| TEST RESULTS | | |
|---|---|---|
|  | Polyester | Aramid |
| Construction | 3900/3 | 1500/3 |
| Twist | 2.7/2.7 | 6.9/6.9 |
| Dipped Cord | | |

TEST RESULTS -continued

|  |  | Polyester | Aramid |
|---|---|---|---|
| Tensile |  | 851.5 | 755.8 |
| Elongation |  | 18.12 | 5.58 |
| Lase 1% | (N) | 91.5 | 97.1 |
| 2% | (N) | 146.2 | 225.6 |
| 3% | (N) | 183.4 | 357.2 |
| 4% | (N) | 217.9 | 505.5 |
| 5% | (N) | 256.3 | / |
| 6% | (N) | 298.8 | 654.5 / |
| Shrinkage Tot. (%) |  | 1.25 | / |
| Perm (%) |  | 1.12 | / |
| Gauge (mm) |  | 1.40 | 0.86 |
| *) Pull-out adhesion test (N) |  | 207.4 | 163.3 |

*) All adhesion tests are compared in same rubber compounds.

*). All adhesion tests are compared in same rubber compounds.

DIPPED PROPERTIES

| Construction | 1000/2 PET | 1650/2 RAYON | 1300/3 PET | 2200/3 RAYON |
|---|---|---|---|---|
| Twist (TPI) | 6.5/6.5 | 9/9 | 4.5/4.5 | 6.5/6.5 |
| Dipping cond. (Tens. g) | 1325/375 | 1100/1500 | 2300/650 | 850/ 850 |
| Stretch (%) | +1.6/−2.2 | +3.0/−0.5 | +1.5/−2.5 | +2.0/−0.5 |
| Tensile (N) | 151.0 | 180 | 293.7 | 350 |
| Elong. (%) | 12.48 | 9.0 | 14.69 | 14.0 |
| Lase 1% (N) | 18.8 | 37.4 | 34.8 | 51.3 |
| 2% (N) | 32.4 | 73.5 | 58.3 | 108.0 |
| 3% (N) | 44.1 | 103.2 | 77.7 | 155.0 |
| 4% (N) | 56.1 | 125.8 | 97.3 | 190.8 |
| 5% (N) | 69.1 | — | 119.6 | — |
| 10% (N) | 139.3 | — | 251.7 | — |
| Work to Brk (Nm) | 2.652 | 2.54 | 6.276 | 8.60 |
| Dtex Dry | 2535 | 3630 | 5018 | 7320 |
| Gauge (mm) | 0.53 | 0.71 | 0.79 | 0.97 |
| *) Pull out adhesion test (N) | 176.1 | 180 | 178.2 | 180 |

*) All adhesion tests are compared in same rubber compounds.

*) All adhesion tests are compared in same rubber compounds.

All linear densities are given in Denier; 1.1 dtex equal 1 Denier.

The above results clearly demonstrate the superior strength/weight performance of tire cords manufactured according to the teaching of the invention when replacing rayon by polyester. When replacing aramid by polyester, cost is the major advantage, but the polyester also shows higher elongation at break.

In the tables, "Elongation" is the maximum length of the cord at break, "Tensile" is the maximum force applied to the cord at break, "Lase" is the load in Newtons at specified elongation (in percent), and "Shrinkage" is the length change in percent, after heat exposure (curing conditions) under minimum applied force.

The use of PET material according to the invention in farm tires of dimension 18.4R38 STR leads to the following results showing an improved stability of the crown dimensions:

| 18.4R38 STR | Rayon 2440/3 6.5/6.5 18EPI | HMLS PET 1440/3 8/8TPI 22EPI | HMLS PET 1440/2/2 5/6TPI 18EPI | HMLS PET LOW TWIST ACC. INVENTION 1440/3 4.5/4.5TPI 20EPI |
|---|---|---|---|---|
| NSK | 51 | 51 | 51 | 52 |
| 0 km OD | 1745 | 1732 | 1728 | 1726 |
| SD | 478 | 482 | 475 | 476 |
| NSK 20.000 km OD | 48 1739 | 48 1729 | 47 1719 | 48 1720 |
| SD | 482 | 483 | 488 | 476 |
| Corrected OD (20.000) Conclusion | 1745 | 1735 | 1727 | 1726 |
| OD% | 0 | +0.2 | −0.1 | 0 |
| SD% | +0.8 | +0.2 | +2.7 | 0 |

NSK—means nonskid or depth of the grooves in the tire.
OD—means the maximum overall diameter of the tire.
SD—means the maximum distance separating the laterally outer portions of the tire sidewalls.

While the invention has been variously illustrated and described, those skilled in the art will recognize that the invention can be variously modified and practiced. The invention is limited only by the following claims.

What is claimed is:

1. A pneumatic tire comprising at least one radial carcass ply, a tread disposed radially outwardly of the crown region of the carcass and a crown reinforcing structure interposed between the tread portion and the crown region of the carcass in circumferential surrounding relation to the carcass, whereby the crown reinforcing structure includes a belt assembly having at least a first, radially innermost and a second, radially outermost belt ply, each of the belt plies comprising reinforcement cords extending parallel to one another in each belt ply, wherein in at least one belt ply each reinforcement cord is a polyester cord having a linear density of 11000 to 13000 Denier and comprising 2 to 9 yarns, and a lateral cord density in the belt plies is 10 to 15 ends per inch (EPI), wherein the yarns have substantially the same twist as the cords and the cord has a twist of 2 to 7 turns per inch (TPI) and a twist multiplier of 3 to 5.

2. A pneumatic tire according to claim 1, wherein the crown reinforcing structure consists of four belt plies.

3. A pneumatic tire according to claim 1, wherein the crown reinforcing structure consists of 2 belt plies.

* * * * *